US012568280B2

(12) United States Patent (10) Patent No.: US 12,568,280 B2
Tsukada (45) Date of Patent: Mar. 3, 2026

(54) IMAGE PROCESSING APPARATUS AND METHOD FOR POSTING SCANNED DOCUMENT DATA TO CHAT THREADS

(71) Applicant: CANON KABUSHIKI KAISHA, Tokyo (JP)

(72) Inventor: Yoshihiro Tsukada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/057,667

(22) Filed: Nov. 21, 2022

(65) Prior Publication Data

US 2023/0171471 A1 Jun. 1, 2023

(30) Foreign Application Priority Data

Nov. 26, 2021 (JP) .................................. 2021-191855

(51) Int. Cl.
*H04N 21/4788* (2011.01)
*G06Q 50/10* (2012.01)
(52) U.S. Cl.
CPC ......... *H04N 21/4788* (2013.01); *G06Q 50/10* (2013.01)
(58) Field of Classification Search
None
See application file for complete search history.

(56) References Cited

U.S. PATENT DOCUMENTS

| | | | | |
|---|---|---|---|---|
| 2010/0167766 A1* | 7/2010 | Duarte | ................ | H04L 65/1069 |
| | | | | 455/466 |
| 2012/0198561 A1* | 8/2012 | Hikichi | .............. | H04N 1/00413 |
| | | | | 726/26 |
| 2017/0099238 A1* | 4/2017 | Malik | ................... | H04L 51/216 |
| 2018/0097757 A1* | 4/2018 | Nguyen | .................. | H04L 67/06 |
| 2019/0026306 A1* | 1/2019 | Choi | ..................... | H04L 65/403 |
| 2023/0059572 A1* | 2/2023 | Yamamoto | ......... | H04N 1/32432 |
| 2023/0105788 A1* | 4/2023 | Yamamoto | .............. | H04L 51/08 |
| | | | | 709/206 |

FOREIGN PATENT DOCUMENTS

| | | | | | |
|---|---|---|---|---|---|
| JP | 2020109899 A | * | 7/2020 | | |
| JP | 2021078084 A | | 5/2021 | | |
| JP | 2023027466 A | | 3/2023 | | |
| JP | 2023027469 A | * | 3/2023 | ............. | H04L 51/08 |
| KR | 20210058669 A | | 5/2021 | | |

* cited by examiner

*Primary Examiner* — Ario Etienne
*Assistant Examiner* — Mohammad Yousuf A. Mian
(74) *Attorney, Agent, or Firm* — Canon U.S.A., Inc. IP Division

(57) ABSTRACT

An image processing apparatus that communicates with an information processing apparatus includes a reading unit that reads an image of a document and generates image data, an acceptance unit that accepts designation of a thread of a channel of a chat service, and a transmission unit that transmits the generated image data to the information processing apparatus so that information indicating the generated image data is added to the thread for the accepted designation.

12 Claims, 14 Drawing Sheets

FIG. 13

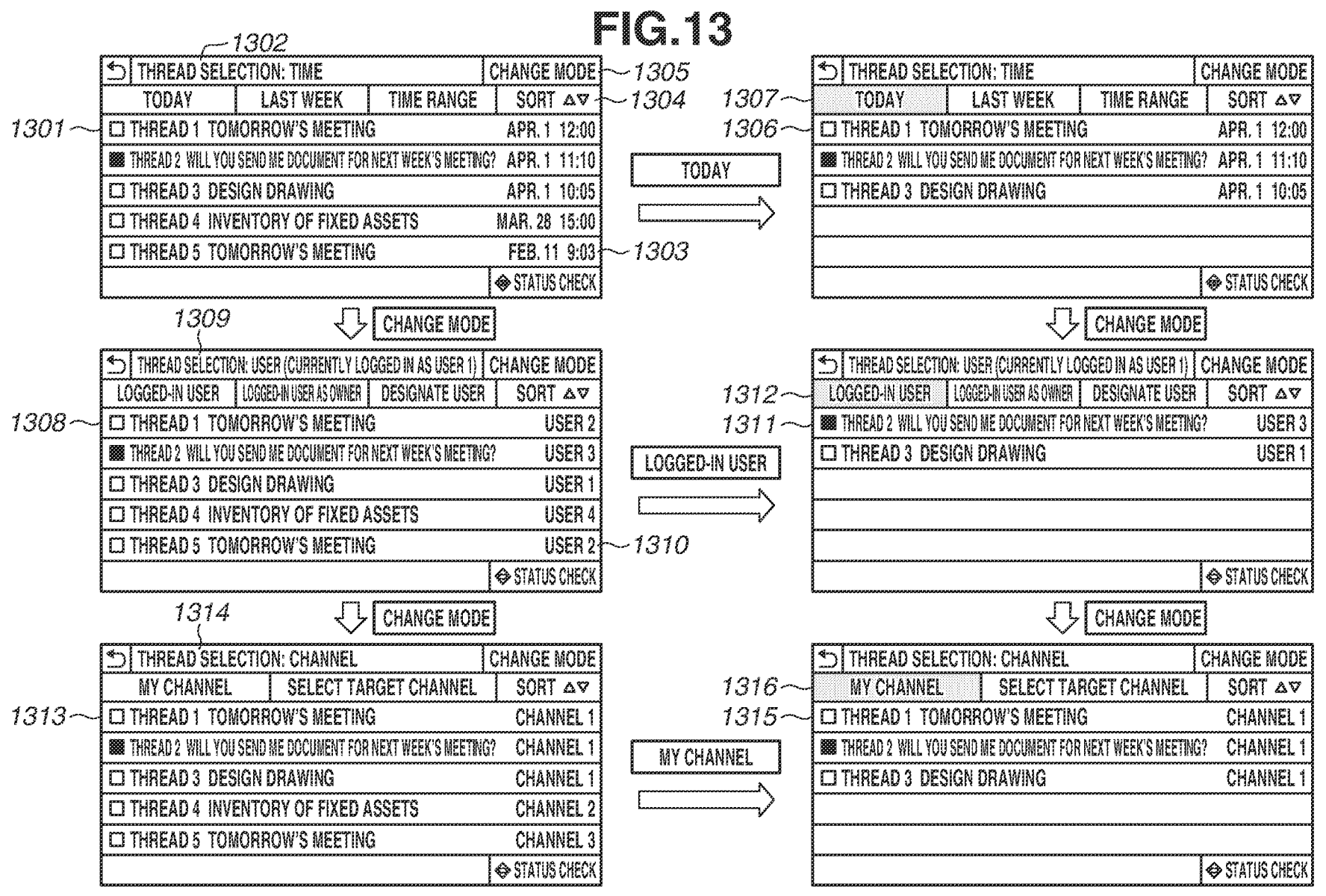

1301 — THREAD SELECTION: TIME

| | TODAY | LAST WEEK | TIME RANGE | CHANGE MODE |
|---|---|---|---|---|
| | | | | SORT ▲▼ |
| ☐ THREAD 1 | TOMORROW'S MEETING | | | APR. 1 12:00 |
| ■ THREAD 2 | WILL YOU SEND ME DOCUMENT FOR NEXT WEEK'S MEETING? | | | APR. 1 11:10 |
| ☐ THREAD 3 | DESIGN DRAWING | | | APR. 1 10:05 |
| ☐ THREAD 4 | INVENTORY OF FIXED ASSETS | | | MAR. 28 15:00 |
| ☐ THREAD 5 | TOMORROW'S MEETING | | | FEB. 11 9:03 |
| | | | | ◆ STATUS CHECK |

1302, 1304, 1305

⇨ CHANGE MODE — TODAY — 1303

1307 — THREAD SELECTION: TIME

| | TODAY | LAST WEEK | TIME RANGE | CHANGE MODE |
|---|---|---|---|---|
| | | | | SORT ▲▼ |
| ☐ THREAD 1 | TOMORROW'S MEETING | | | APR. 1 12:00 |
| ■ THREAD 2 | WILL YOU SEND ME DOCUMENT FOR NEXT WEEK'S MEETING? | | | APR. 1 11:10 |
| ☐ THREAD 3 | DESIGN DRAWING | | | APR. 1 10:05 |
| | | | | ◆ STATUS CHECK |

1306

⇩ CHANGE MODE

1308 — THREAD SELECTION: USER (CURRENTLY LOGGED IN AS USER 1)

| | LOGGED-IN USER | LOGGED-IN USER AS OWNER | DESIGNATE USER | CHANGE MODE |
|---|---|---|---|---|
| | | | | SORT ▲▼ |
| ☐ THREAD 1 | TOMORROW'S MEETING | | | USER 2 |
| ■ THREAD 2 | WILL YOU SEND ME DOCUMENT FOR NEXT WEEK'S MEETING? | | | USER 3 |
| ☐ THREAD 3 | DESIGN DRAWING | | | USER 1 |
| ☐ THREAD 4 | INVENTORY OF FIXED ASSETS | | | USER 4 |
| ☐ THREAD 5 | TOMORROW'S MEETING | | | USER 2 |
| | | | | ◆ STATUS CHECK |

1309, 1311, 1312

⇨ CHANGE MODE — LOGGED-IN USER — 1310

1312 — THREAD SELECTION: USER (CURRENTLY LOGGED IN AS USER 1)

| | LOGGED-IN USER | LOGGED-IN USER AS OWNER | DESIGNATE USER | CHANGE MODE |
|---|---|---|---|---|
| | | | | SORT ▲▼ |
| ☐ THREAD 1 | TOMORROW'S MEETING | | | USER 2 |
| ■ THREAD 2 | WILL YOU SEND ME DOCUMENT FOR NEXT WEEK'S MEETING? | | | USER 3 |
| ☐ THREAD 3 | DESIGN DRAWING | | | USER 1 |
| | | | | ◆ STATUS CHECK |

⇩ CHANGE MODE

1313 — THREAD SELECTION: CHANNEL

| | MY CHANNEL | SELECT TARGET CHANNEL | CHANGE MODE |
|---|---|---|---|
| | | | SORT ▲▼ |
| ☐ THREAD 1 | TOMORROW'S MEETING | | CHANNEL 1 |
| ■ THREAD 2 | WILL YOU SEND ME DOCUMENT FOR NEXT WEEK'S MEETING? | | CHANNEL 1 |
| ☐ THREAD 3 | DESIGN DRAWING | | CHANNEL 1 |
| ☐ THREAD 4 | INVENTORY OF FIXED ASSETS | | CHANNEL 2 |
| ☐ THREAD 5 | TOMORROW'S MEETING | | CHANNEL 3 |
| | | | ◆ STATUS CHECK |

1314, 1315, 1316

⇨ CHANGE MODE — MY CHANNEL

1316 — THREAD SELECTION: CHANNEL

| | MY CHANNEL | SELECT TARGET CHANNEL | CHANGE MODE |
|---|---|---|---|
| | | | SORT ▲▼ |
| ☐ THREAD 1 | TOMORROW'S MEETING | | CHANNEL 1 |
| ■ THREAD 2 | WILL YOU SEND ME DOCUMENT FOR NEXT WEEK'S MEETING? | | CHANNEL 1 |
| ☐ THREAD 3 | DESIGN DRAWING | | CHANNEL 1 |
| | | | ◆ STATUS CHECK |

⇩ CHANGE MODE

IMAGE PROCESSING APPARATUS AND METHOD FOR POSTING SCANNED DOCUMENT DATA TO CHAT THREADS

BACKGROUND

Field

The present disclosure relates to an image processing apparatus, a method for controlling the same, and a storage medium.

Description of the Related Art

Japanese Patent Application Laid-Open No. 2021-78084 discusses an image processing apparatus that transmits image data generated by scanning a document image to a chat server providing a chat service.

The transmitted image data is uploaded to a talk room of the chat service and shared.

In the talk room of the chat service, a plurality of chats is grouped together as a thread for each series of conversations. A user chats using different threads for different topics and thus the user can collectively check each series of conversations.

With the technique discussed in Japanese Patent Application Laid-Open No. 2021-78084, it is unpredictable which thread on the talk room the image data generated by the image processing apparatus by scanning the document image is to be uploaded to, so that the image data may be uploaded to a thread that is not intended by the user.

SUMMARY OF THE INVENTION

Aspects of the present disclosure are directed to enabling a user to easily upload image data generated by an image processing apparatus by scanning a document image to a desired thread.

According to an aspect of the present disclosure, an image processing apparatus that communicates with an information processing apparatus includes a reading unit configured to read an image of a document and generate image data, an acceptance unit configured to accept designation of a thread of a channel of a chat service, and a transmission unit configured to transmit the generated image data to the information processing apparatus so that information indicating the generated image data is added to the thread for the accepted designation.

Further features of the present disclosure will become apparent from the following description of exemplary embodiments with reference to the attached drawings.

BRIEF DESCRIPTION OF THE DRAWINGS

FIG. 13 is a diagram illustrating an example of a thread selection screen.

DESCRIPTION OF THE EMBODIMENTS

Exemplary embodiments of the present disclosure will be described below with reference to the drawings. It should be noted that configurations according to the below-described exemplary embodiments are mere examples and that these illustrated configurations are not seen to be limiting.

Figure 1:
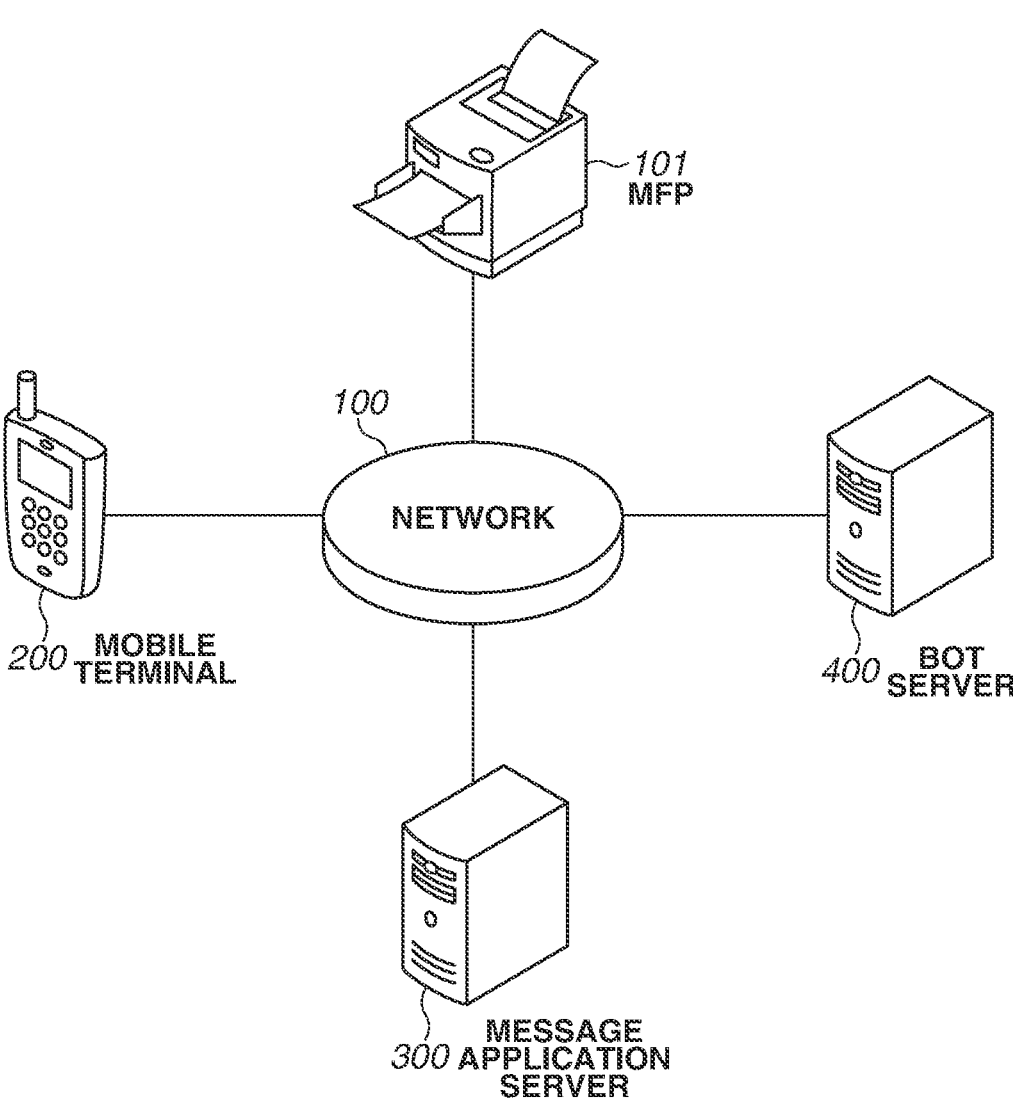
FIG. 1 is a diagram illustrating an example of a system configuration according to an aspect of the present disclosure.

FIG. 1 is a diagram illustrating an example of a system configuration according to an exemplary embodiment and includes a mobile terminal 200, a multi-function peripheral (MFP) 101, and a message application server 300. The mobile terminal 200 is an example of a terminal apparatus. The MFP 101, which is an image processing apparatus, and the message application server 300 communicate with the mobile terminal 200 via a network 100. A bot server 400 also communicates with the mobile terminal 200 via the network 100. The message application server 300 is a chat server that manages a chat service of receiving messages and image data from the MFP 101 and the mobile terminal 200 and displaying the received messages and image data on the mobile terminal 200 or a personal computer (PC) (not illustrated) by user operations. The bot server 400 associates the MFP 101 with information (token information) corresponding to a bot application installed in the message application server 300 to be connected to the MFP 101, and transfers requests from the MFP 101 to the message application server 300.

The network 100 according to the present exemplary embodiment can be the Internet or a local area network (LAN). The network 100 can also be a wired network or a wireless network.

Figure 2:
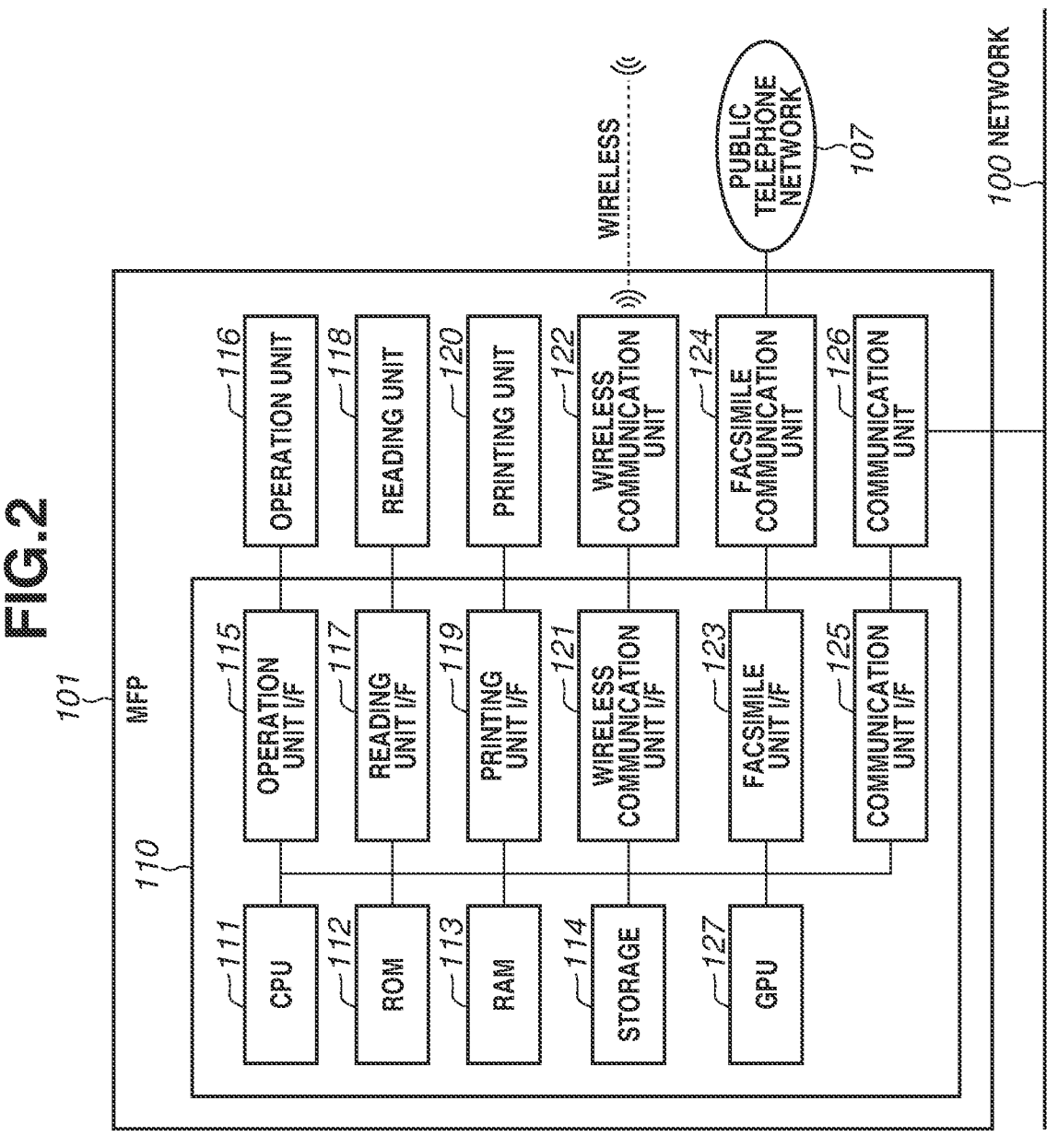
FIG. 2 is a diagram illustrating an example of a hardware configuration of a multi-function peripheral (MFP).

FIG. 2 is a diagram illustrating an example of a hardware configuration of the MFP 101. The MFP 101 includes a central processing unit (CPU) 111, a read-only memory (ROM) 112, a random access memory (RAM) 113, a storage 114, an operation unit interface (I/F) 115, an operation unit 116, a reading unit I/F 117, a reading unit 118, a printing unit I/F 119, a printing unit 120, a wireless communication unit I/F 121, and a wireless communication unit 122. The MFP 101 also includes a facsimile unit I/F 123, a facsimile communication unit 124, a communication unit I/F 125, and a communication unit 126.

A control unit 110 including the CPU 111 controls overall operations of the MFP 101. The CPU 111 reads control programs stored in the ROM 112 or the storage 114 to the RAM 113 and performs various types of control, such as reading control and printing control. The ROM 112 stores control programs executable by the CPU 111. The ROM 112 also stores a boot program and font data. The RAM 113 is a main storage memory and is used as a temporary storage area for developing various control programs stored in a work area, the ROM 112, and the storage 114. The storage 114 stores image data, print data, various programs, and various types of setting information. While the storage 114 in the present exemplary embodiment is a flash memory, in another exemplary embodiment, an auxiliary storage device, such as a solid state drive (SSD) or a hard disc drive (HDD), can be used as the storage 114. In still another exemplary embodiment, an embedded multimedia card (eMMC) can be used as the storage 114.

In the present exemplary embodiment, one CPU 111 performs processes illustrated in flowcharts described below using one memory (the RAM 113) in the MFP 101. In another exemplary embodiment, for example, a plurality of CPUs, a plurality of RAMs, a plurality of ROMs, and a plurality of storages can perform the processes illustrated in the flowcharts described below in collaboration with each other. In still yet another exemplary embodiment, part of the processes can be performed by a hardware circuit, such as an application-specific integrated circuit (ASIC) or a field-programmable gate array (FPGA).

The operation unit I/F 115 connects the operation unit 116 and the control unit 110. The operation unit 116 includes a display unit, such as a touch panel, and hardware keys. The operation unit 116 displays information to a user and detects user input.

The reading unit I/F 117 connects the reading unit 118, such as a scanner, and the control unit 110. The reading unit 118 reads a document image, and the CPU 111 converts the read image into image data, such as binary data. The image data generated based on the image read by the reading unit 118 is transmitted to an external apparatus and/or printed on a recording sheet. The reading unit 118 also includes an automatic document feeder (ADF) (not illustrated), where a document placed on the ADF is conveyed, and the reading unit 118 reads an image on the conveyed document and generates image data based on the read image.

The printing unit I/F 119 connects the printing unit 120, such as a printer, and the control unit 110. The CPU 111 transfers image data (print data) stored in the RAM 113 to the printing unit 120 via the printing unit I/F 119. The printing unit 120 prints an image based on the transferred image data on a recording sheet fed from a sheet feeding cassette (not illustrated).

The wireless communication unit I/F 121 is an I/F for controlling the wireless communication unit 122. The wireless communication unit I/F 121 wirelessly connects the control unit 110 to an external wireless apparatus (the mobile terminal 200 herein).

The control unit 110 is connected to a public telephone network 107 by controlling the facsimile communication unit 124, such as a facsimile, via the facsimile unit I/F 123. The facsimile unit I/F 123 can connect to the public telephone network 107 and control facsimile communication protocols by controlling a modem for facsimile communication and a network control unit (NCU).

The communication unit I/F 125 connects the control unit 110 and the network 100. The communication unit 126 transmits image data and various types of information in the MFP 101 to an external apparatus on the network 100 and receives print data and information on the network 100 from an external apparatus, e.g., an information processing apparatus, on the network 100 via the communication unit I/F 125. The transmission and the reception via the network 100 can be performed using an electronic mail or a file transmission method using another protocol (e.g., File Transfer Protocol (FTP), Server Message Block (SMB), and Web-based Distributed Authoring and Versioning (WEBDAV).

Image data and various types of setting data can be transmitted and received via the network 100 via access from the mobile terminal 200, the message application server 300, and/or the bot server 400 using Hypertext Transfer Protocol (HTTP) communication.

Figure 3:
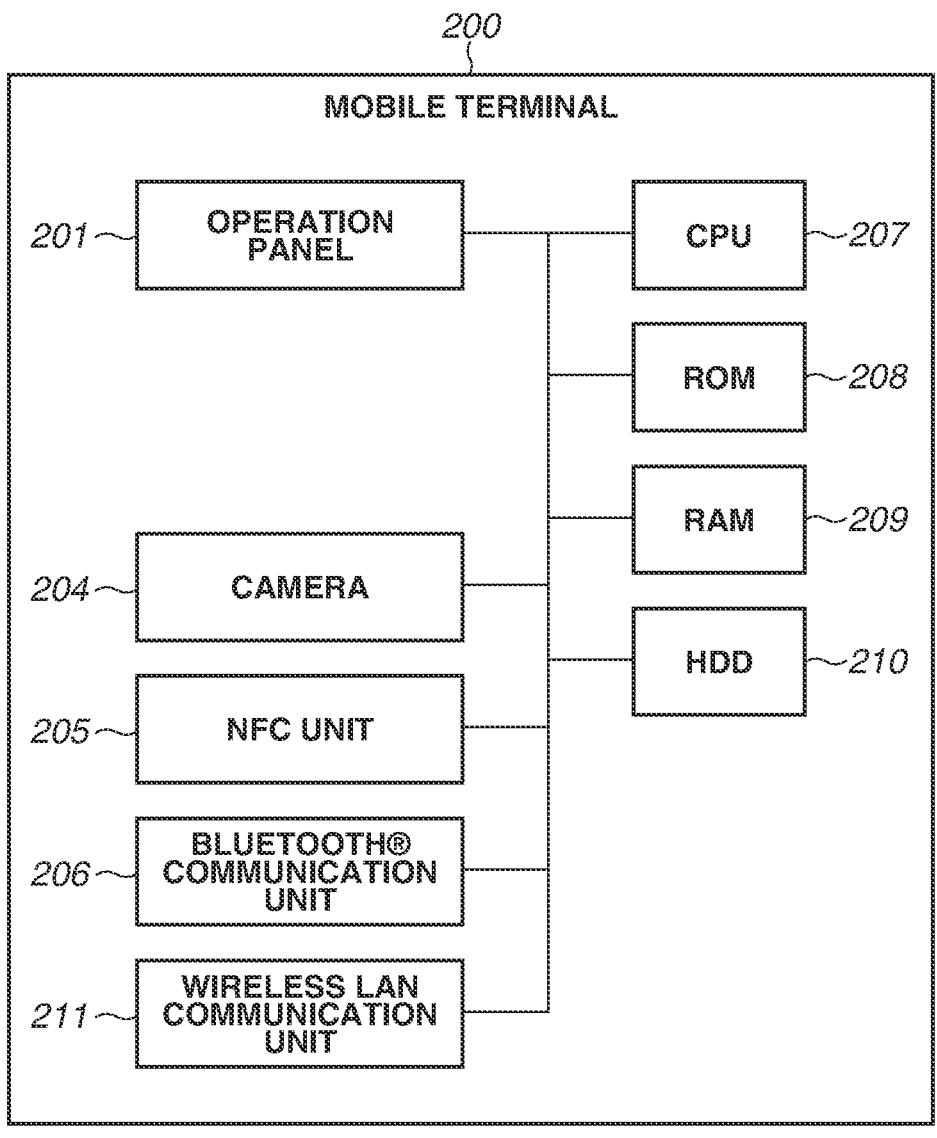
FIG. 3 is a diagram illustrating an example of a hardware configuration of a mobile terminal.

FIG. 3 is a diagram illustrating an example of a hardware configuration of the mobile terminal 200. The mobile terminal 200 according to the present exemplary embodiment is, for example, an apparatus such as a smartphone or a tablet PC. However, any apparatus that performs Wi-Fi® communication and enables practice of the present exemplary embodiment can be used as the mobile terminal 200.

A CPU 207 reads a control program stored in a ROM 208 and performs various processes for controlling operations of the mobile terminal 200. The ROM 208 stores control programs. A RAM 209 is used as a main memory of the CPU 207 and a temporary storage area, such as a work area. An HDD 210 stores various types of data, such as images and electronic documents.

An operation panel 201 includes a touch panel function of detecting touch operations of a user and displays various screens provided by an operating system (OS) or an e-mail transmission application. The operation panel 201 is used to check information stored on the message application server 300. The user can input desired operation instructions to the mobile terminal 200 by inputting touch operations to the operation panel 201. The mobile terminal 200 includes hardware keys (not illustrated), and the user can input operation instructions to the mobile terminal 200 using the hardware keys.

A camera 204 performs image capturing based on an image capturing instruction from a user. Images captured by the camera 204 are stored in a predetermined area of the HDD 210. Information can be acquired from a quick response code (QR Code®) read with the camera 204 using a program that analyzes QR Codes®.

The mobile terminal 200 can transmit and receive data to and from various peripheral devices via a near-field communication (NFC) unit 205, a Bluetooth® communication unit 206, or a wireless LAN communication unit 211. The Bluetooth® communication unit 206 of the mobile terminal 200 can support Bluetooth® Low Energy.

Figure 4:
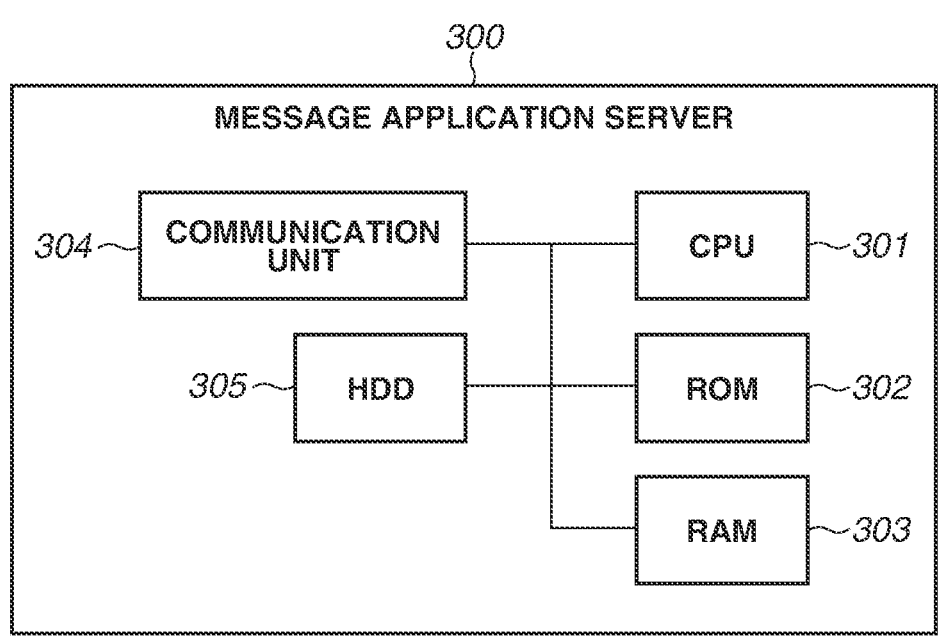
FIG. 4 is a diagram illustrating an example of a hardware configuration of a message application server.

FIG. 4 is a diagram illustrating an example of a hardware configuration of the message application server 300. A CPU 301 reads a control program stored in a ROM 302 and performs various processes for controlling operations of the message application server 300. The ROM 302 stores control programs. A RAM 303 is used as a main memory of the CPU 301 and a temporary storage area such as a work area. An HDD 305 stores various types of data, such as messages, image data, and channel information. The message application server 300 can transmit and receive data to and from various apparatuses, such as the mobile terminal 200 and the MFP 101, via a communication unit 304. The communication unit 304 can perform wired communication using Ethernet® and wireless communication such as Wi-Fi®.

Figure 5:
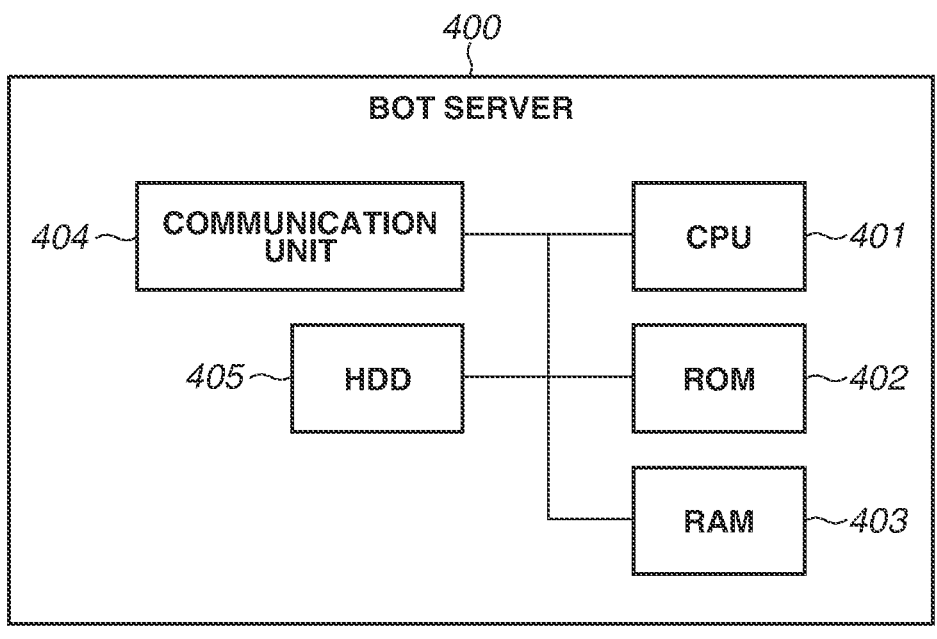
FIG. 5 is a diagram illustrating an example of a hardware configuration of a bot server.

FIG. 5 is a diagram illustrating an example of a hardware configuration of the bot server 400. A CPU 401 reads control a program stored in a ROM 402 and performs various processes for controlling operations of the message application server 300. The ROM 402 stores control programs. A RAM 403 is used as a main memory of the CPU 401 and a temporary storage area such as a work area. An HDD 405 stores various types of data, such as messages, image data, and channel information. The bot server 400 can transmit and receive data to and from various apparatuses, such as the mobile terminal 200, the MFP 101, and the message application server 300, via a communication unit 404.

Figure 6:
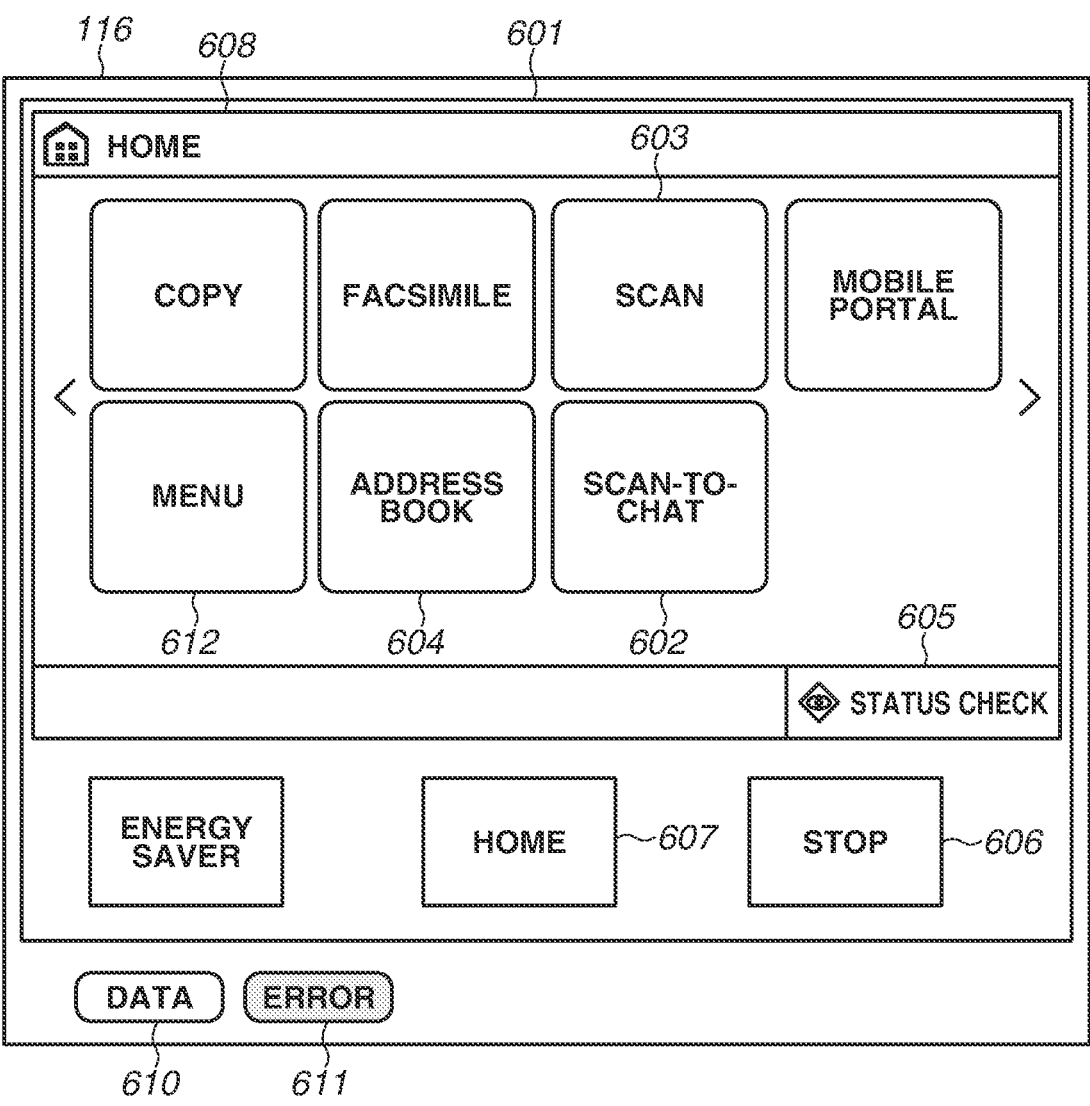
FIG. 6 is a diagram illustrating an example of a home screen displayed on an operation unit 116 of the MFP.

FIG. 6 is a diagram illustrating an example of a home screen displayed on the operation unit 116 of the MFP 101.

The operation unit 116 includes a touch panel 601 and light emitting diodes (LEDs) 610 and 611. The touch panel 601 displays an operation screen. The touch panel 601 is an instruction unit and functions as an acceptance unit for accepting user instructions and also as a display unit for displaying screens. A user directly touches a screen displayed on the touch panel 601 with an object, such as a finger or a stylus, and inputs an instruction to perform a function based on the displayed screen.

The touch panel 601 illustrated in FIG. 6 displays a home screen 608. The home screen 608 is the first screen for inputting an instruction to perform a function of the MFP 101 and is a screen for selecting a display screen for setting various settings for a function, such as a copy function, a facsimile function, a scan function, or a media print function, that is to be performed by the MFP 101.

A status check button 605 is an object for displaying a screen (status check screen) for checking a state of the MFP 101. A transmission history and a job execution history can be displayed on the status check screen (not illustrated).

Figures 11A, 11B:
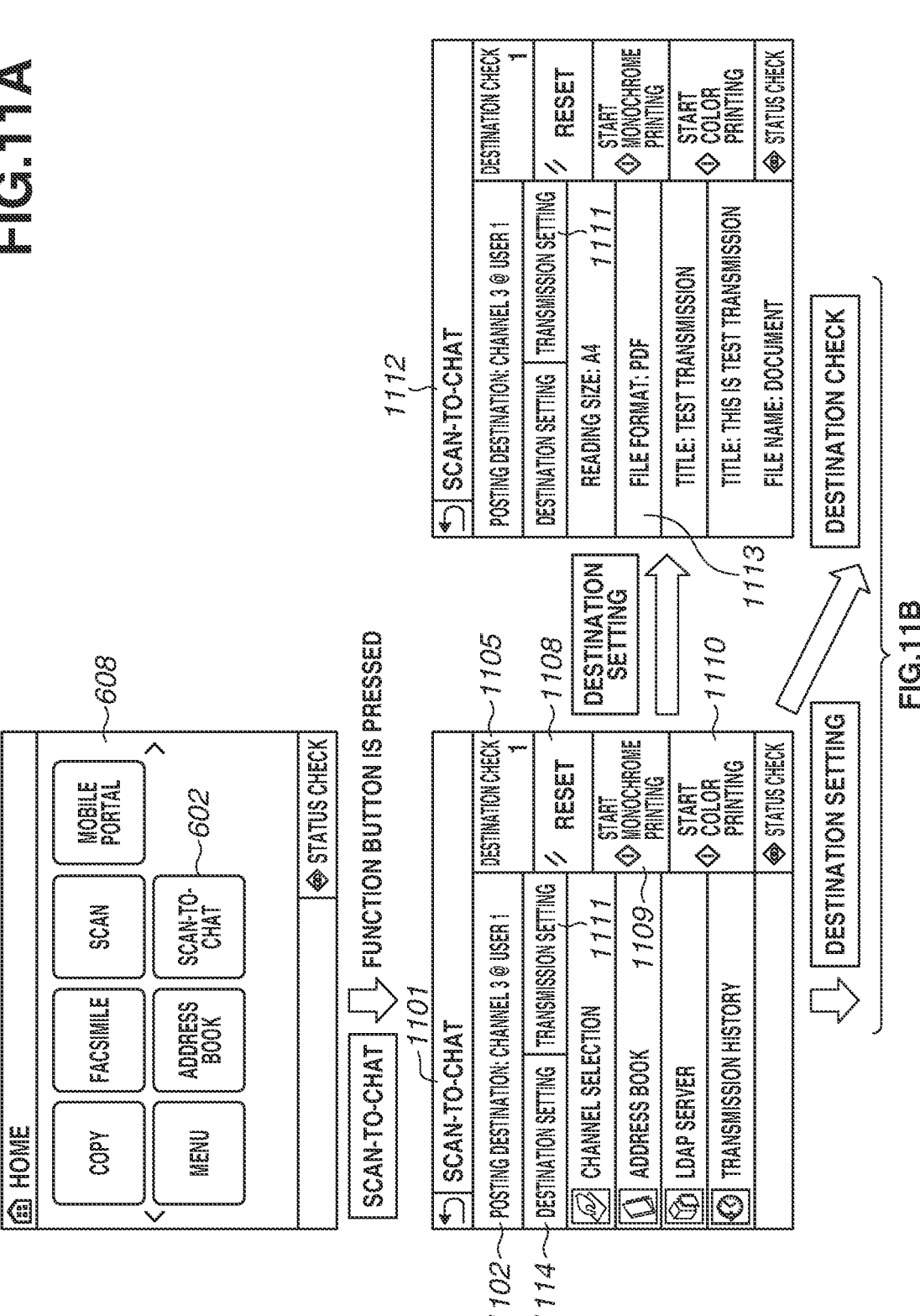
FIGS. 11A and 11B are diagrams illustrating an example of screen changes in the scan-to-chat process.

A scan-to-chat button 602 is an object for displaying a scan-to-chat process setting screen. In a case where the scan-to-chat button 602 is selected by a user, a scan-to-chat screen 1101 illustrated in FIG. 11A is displayed on the operation unit 116. The scan-to-chat process will be described in detail below with reference to FIGS. 7 and 8.

A scan button 603 is an object for displaying a scan selection screen (not illustrated) from the MFP 101. The scan selection screen is a screen for selecting a transmission function, such as electronic mail transmission (e-mail), file transmission using SMB, FTP, or HTTP, and Internet facsimile (I-facsimile) transmission. When a displayed object representing a transmission function is selected, a setting screen for the transmission function is displayed.

An address book button 604 is an object for displaying an address book screen of the MFP 101 if the address book button 604 is selected by a user. The LEDs 610 and 611 are configured to notify a state of the MFP 101 to a user. The LED 610 is turned on during receipt or execution of an e-mail or a print job, and the LED 611 is turned on when an error occurs in the MFP 101. A stop button 606 is an object for cancelling various operations, and is an object that is constantly displayed on the operation unit 116. A home button 607 is an object for displaying the home screen 608, and is an object that is constantly displayed on the operation unit 116. A menu button 612 is an object for displaying a screen for setting preferences, such as a display language, and settings for the functions.

Figure 7:
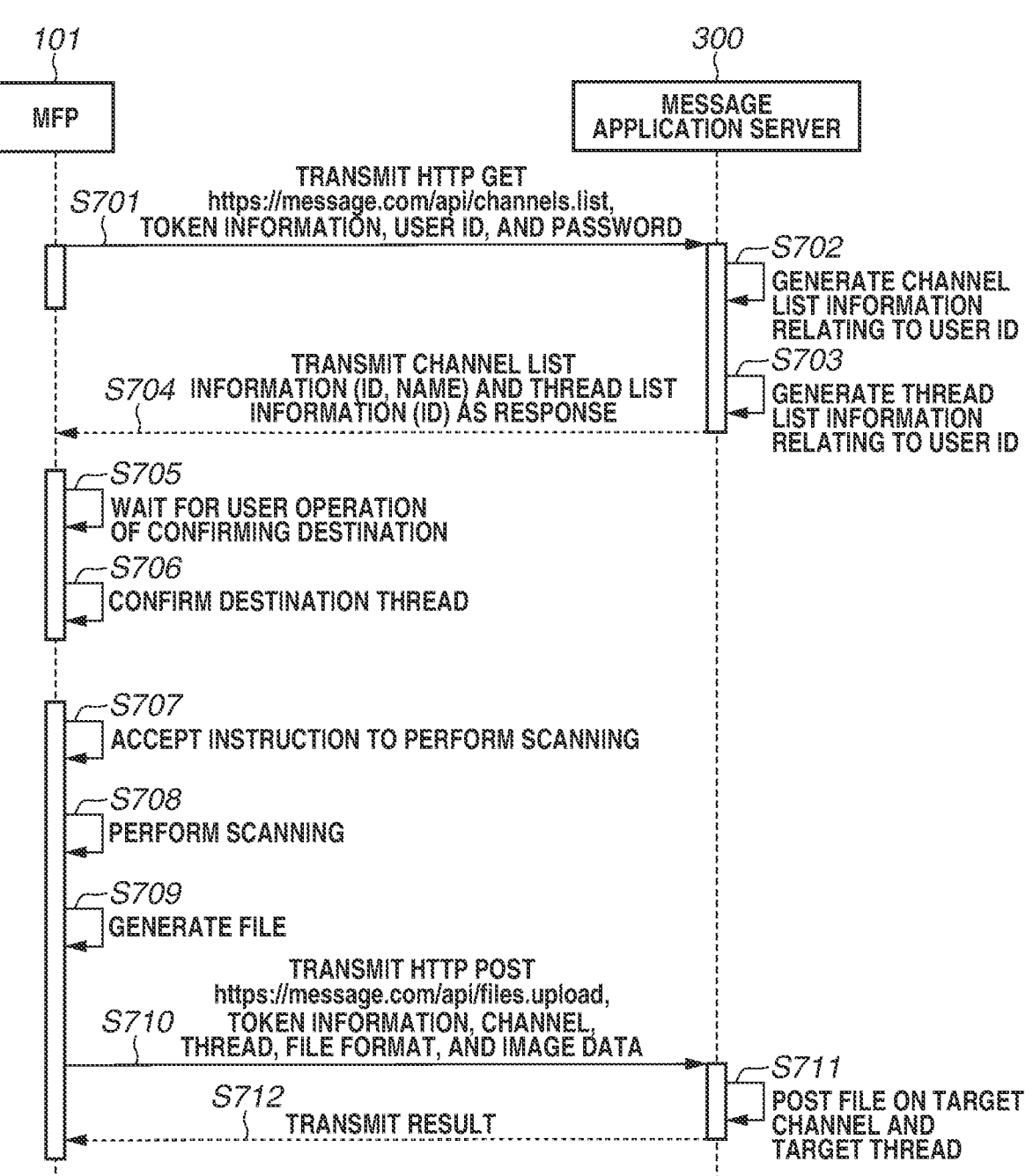
FIG. 7 is a diagram illustrating an example of a sequence of transmitting a file generated by a scan by the MFP to the message application server.

FIG. 7 is a diagram illustrating an example of a sequence of transmitting a file generated by a scan operation by the MFP 101 to the message application server 300. The sequence illustrated in FIG. 7 is started if a destination setting button 1114 on the scan-to-chat screen 1101 in FIG. 11A is selected.

In step S701, the CPU 111 of the MFP 101 controls the communication unit 126 and transmits a request for channel list information and thread list information to the message application server 300 via HTTP communication. Specifically, the CPU 111 of the MFP 101 transmits token information input to the MFP 101 and information indicating a request for a list of channels in a workspace indicated by the token information to the message application server 300. At this time, user identification (user ID) information input to the MFP 101 is transmitted to the message application server 300, whereby information relating to the user ID in the workspace is specified. When only the user is personally provided a right to read and write user information about the user in the workspace, the right is acquired by transmitting password information corresponding to the user ID information input to the MFP 101 to the message application server 300.

An example of a command to be transmitted is "HTTP GET https://message.com/api/channels.list". This universal resource locator (URL) "https://message.com/api/channels.list" described in the command is a URL for accessing the message application server 300.

The token information is transmitted to the URL, and the message application server 300 searches for a channel associated with the workspace corresponding to the token information and the user. Similarly, the token information and the user ID are transmitted to the URL "https://message.com/api/thread.list", and the message application server 300 searches for a thread associated with the workspace corresponding to the token information and the user. The token information is input by the user via a setting registration screen 1201 in FIG. 12 displayed on the operation unit 116 of the MFP 101.

A workspace herein is similar to an organization to which a plurality of users belongs in the message application, and is also referred to as "team". A channel is similar to a chatroom in a workspace. A chatroom herein refers to a system where a plurality of users participating in the chatroom can transmit and receive messages to and from each other as in conversations. While channels are described as chatrooms according to the present exemplary embodiment, channels are not limited to chatrooms and can be any systems where a plurality of users can transmit and receive messages to and from each other as in conversations. For example, group chats, rooms, talk rooms, or groups can be used.

A bot application herein refers to an application for registering the MFP 101 as a user in the message application and posting messages and image data. The bot application is installed in the message application server 300. Image data is transmitted to the message application server 300 with a bot application designated, and the designated bot application posts the transmitted image data on the message application. The HDD 305 of the message application server 300 stores bot applications and tokens in association with each other, and the bot applications are associated with workspaces. Thus, with the token information received from the MFP 101, the message application server 300 can return workspace information associated with the bot application associated with the token information. The token information, the bot application, and the workspace can be associated directly with each other. This enables selection of a workspace (workspace to which the user intends to transmit image data) corresponding to pre-registered token information from a number of workspaces.

In step S702, the CPU 301 of the message application server 300 determines whether access to the URL is permitted based on the token information and the user ID that are received from the MFP 101 via the communication unit 304. If access is permitted, channel list information about channels included in the workspace corresponding to the token information is generated. The channel list information refers to array information indicating channel information. The channel information includes channel ID, channel name, information indicating users participating in the channel, and a channel setting value indicating a setting of whether the channel is an archive channel.

In step S703, the CPU 301 of the message application server 300 determines whether access to the URL is permitted based on the token information and the user ID that are received from the MFP 101 via the communication unit 304. If access is permitted, the CPU 301 generates thread list information about threads included in the workspace corresponding to the token information. The thread list information refers to array information indicating thread information. The thread information includes thread ID, content of posts on the thread, user ID information about the posts on the thread, and a thread setting value indicating information about time of updating the thread.

In step S704, the CPU 301 of the message application server 300 controls the communication unit 304 and transmits to the MFP 101, as HTTP communication response information, the channel list information generated in step S702 and the thread list information generated in step S703.

In step S705, the CPU 111 of the MFP 101 generates a channel selection screen 1119 based on the channel information included in the received channel list information. If the destination setting button 1114 is selected by the user, the CPU 111 of the MFP 101 displays the channel selection screen 1119 on the touch panel 601 of the operation unit 116 and waits for a user operation. The channel selection screen 1119 will be described below with reference to FIG. 11B.

In step S706, if at least a channel is selected on the channel selection screen 1119 and a return button is selected, the CPU 111 of the MFP 101 confirms posting destination channel information. After the channel is selected, the user selects a thread selection button 1118, and a thread selection screen 1120 is displayed. If a thread is selected on the thread selection screen 1120 and a return button is selected, posting destination thread information is confirmed.

In step S707, the CPU 111 of the MFP 101 accepts a scan execution instruction via the operation unit 116.

In step S708, the CPU 111 of the MFP 101 initiates a scan operation to scan a document image based on the scan execution instruction and scan settings set by the user.

In step S709, the CPU 111 of the MFP 101 generates image data in a format set in the scan settings based on the scanned image. The scan settings that are designated by the user on a scan-to-chat advanced setting screen (not illustrated) are used. The scan settings can be displayed together with transmission settings on a transmission setting screen 1112 in FIG. 11A and set.

In step S710, the CPU 111 of the MFP 101 transmits, to the message application server 300 via the communication unit 126, the token information that is the same as the token information transmitted in step S701 and the posting destination channel information selected in step S706 via HTTP communication. The posting destination thread information (identification information such as thread ID), the file format, and the image data generated in step S709 are also transmitted via HTTP communication. The file format to be used is the file format designated by the user via the transmission setting screen 1112 of scan-to-chat.

In step S711, the CPU 301 of the message application server 300 searches for workspace information and application information that are registered using the token information received in step S710 and stores the received image data in association with the channel designated by the channel information. In a case where a posting destination thread is designated, the received image data is stored with respect to the posting destination thread. In a case where the user activates the message application on the mobile terminal 200 and designates a thread to check content of a previous conversation on the thread, a screen on which the received image data is posted on the designated thread of the designated channel is displayed. In a case where a posting destination user is designated, the received image data is stored in association with the channel and the posting destination user. In a case where the user activates the message application on the mobile terminal 200 and designates a channel to check content of a previous conversation on the channel, a screen on which the received image data is posted is displayed. The screen is a screen displayed on a display unit of a terminal having accessed the message application server 300.

In step S712, the CPU 301 of the message application server 300 transmits a result indicating whether the posting is successful as HTTP communication response information to the MFP 101.

In a case where the posting is successful, the CPU 111 of the MFP 101 can display a notification indicating that the posting is successful on the operation unit 116. In a case where the posting fails, the CPU 111 of the MFP 101 can display a notification indicating that the posting fails on the operation unit 116. While a notification indicating that the posting fails is displayed in a case where the posting fails, no notification can be displayed in a case where the posting is successful.

Figure 8:
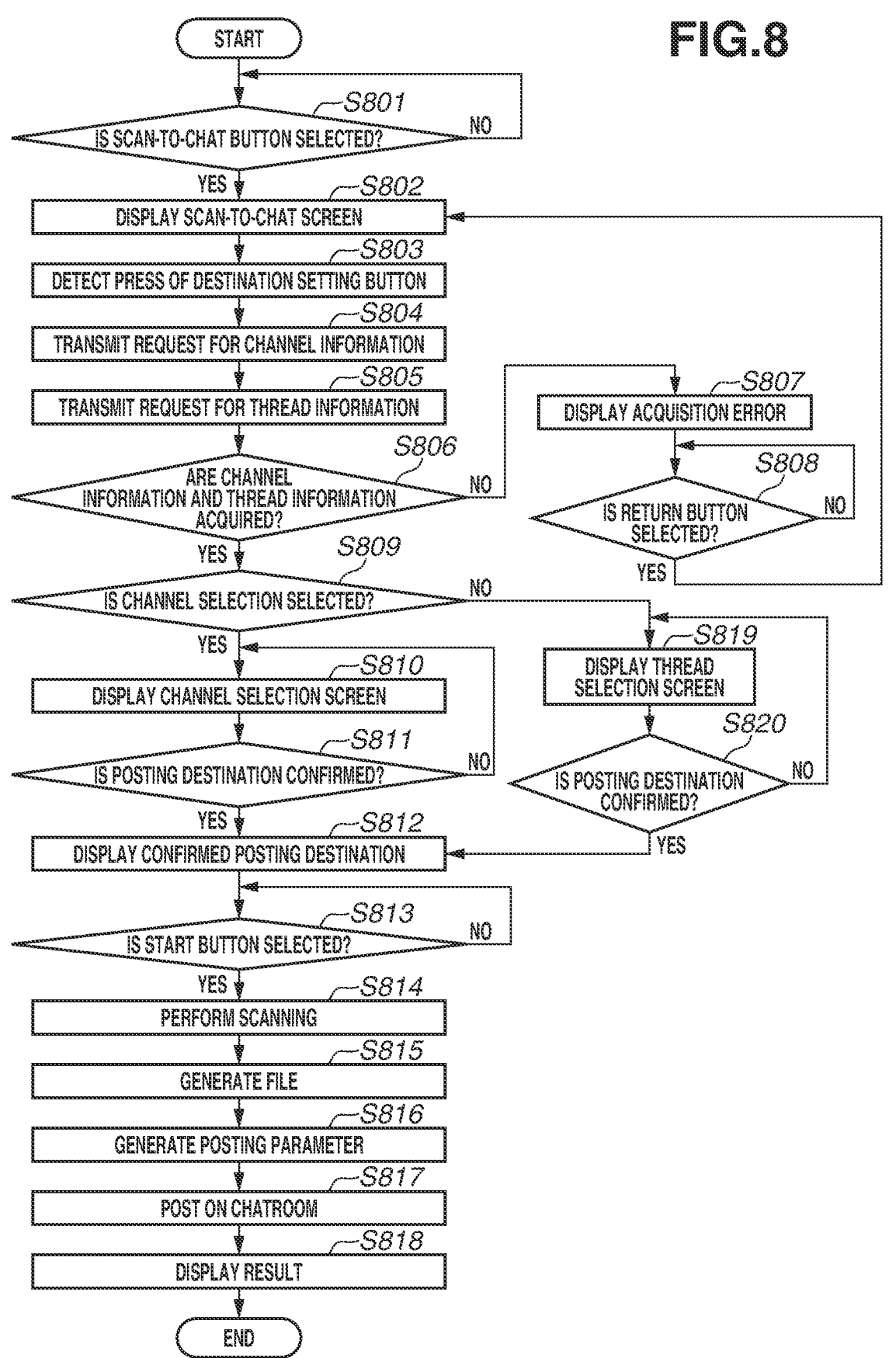
FIG. 8 is a flowchart illustrating an example of a scan-to-chat process performed by the MFP.

FIG. 8 is a flowchart illustrating an example of a scan-to-chat process performed by the MFP 101. The CPU 111 reads a program stored in the ROM 112 to the RAM 113 and executes the read program, whereby the process of the flowchart illustrated in FIG. 8 is performed. The processing flow in FIG. 8 is started when the MFP 101 is turned on.

In step S801, the CPU 111 determines whether the scan-to-chat button 602 is selected. If the CPU 111 determines that the scan-to-chat button 602 is selected (YES in step S801), the processing proceeds to step S802. Otherwise (No in step S801), the processing returns to step S801.

In step S802, the CPU 111 displays the scan-to-chat screen 1101 on the touch panel 601 of the operation unit 116. Screen transitions in the case where the scan-to-chat button 602 is selected will now be described with reference to FIGS. 11A and 11B.

FIGS. 11A and 11B are diagrams illustrating an example of screen changes in the scan-to-chat process. In a case where the scan-to-chat button 602 displayed on the home screen 608 is selected, the scan-to-chat screen 1101 is displayed on the touch panel 601 of the operation unit 116.

On the scan-to-chat screen 1101, a destination check button 1105 is displayed.

Figure 11B:
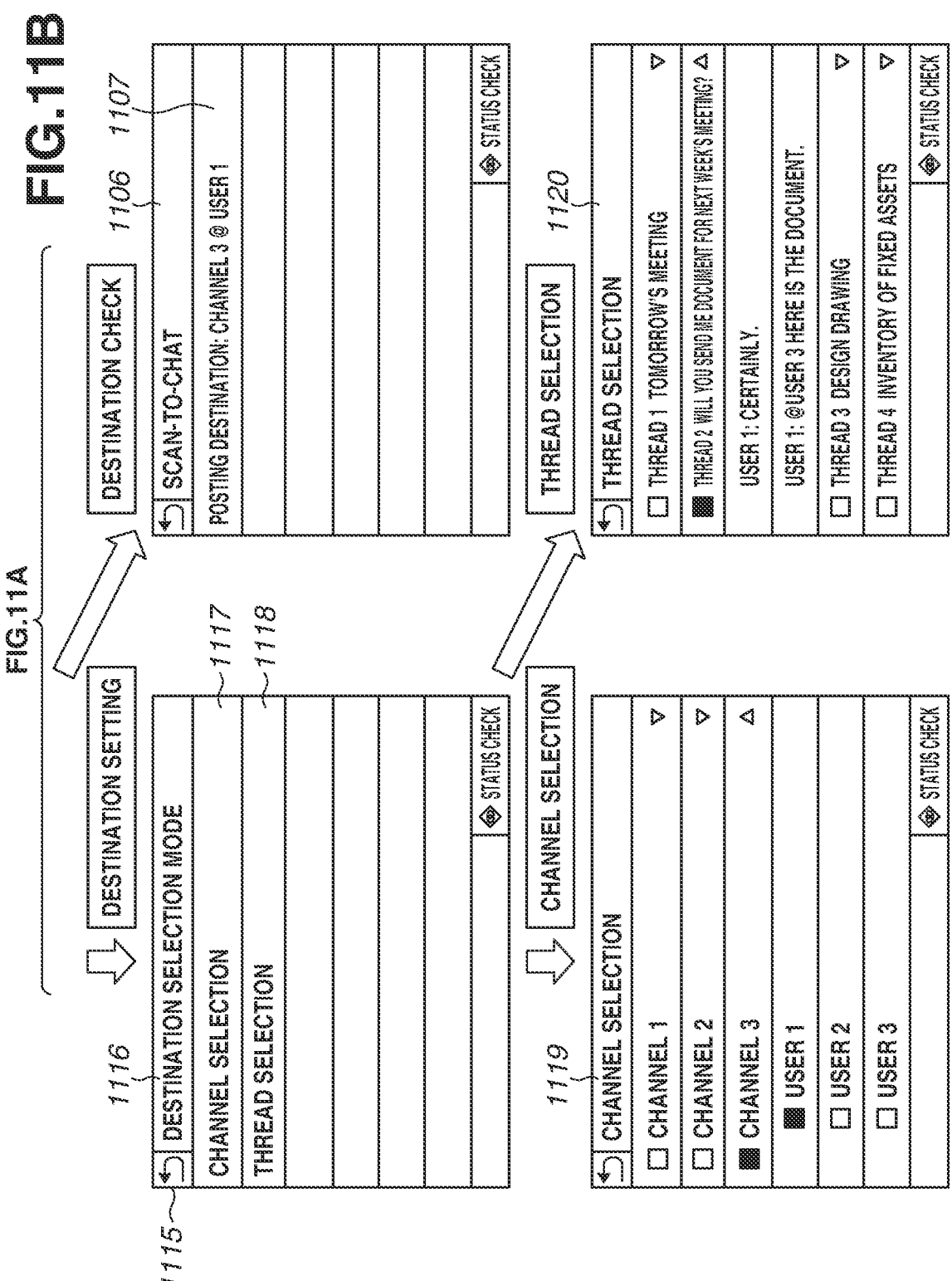

On the destination check button 1105, the number of destinations set as a posting destination of image data generated by scanning is displayed. A case where one posting destination channel is selected is described in FIG. 11 as an example. In a case where a plurality of destinations is selected, the number of set posting destinations is displayed as the number of destinations.

If the destination check button 1105 is selected, a scan-to-chat destination check screen 1106 is displayed. On the scan-to-chat destination check screen 1106, a transmission setting posting destination set by selecting the destination setting button 1114 is displayed. On a posting destination button 1107, the number of posting destinations that are set at this time point is displayed, and if the posting destination button 1107 is selected by the user, a details screen (not illustrated) is displayed, and details of the set posting destination are displayed.

While only one posting destination is displayed on the scan-to-chat destination check screen 1106 according to the present exemplary embodiment, the display is not limited to the foregoing display. For example, the MFP 101 can set a plurality of posting destinations from the message application server 300 to display a plurality of posting destination buttons on the scan-to-chat destination check screen 1106.

In a case where a reset button 1108 is selected on the scan-to-chat screen 1101, the set information is cleared. At this time, the set destination information is also cleared. In a case where a start monochrome printing button 1109 or a start color printing button 1110 is selected on the scan-to-chat screen 1101, a scan-and-transmit process is started.

If a transmission setting button 1111 is selected, the transmission setting screen 1112 is displayed. On the transmission setting screen 1112, transmission settings, such as a file format 1113, can be changed and checked.

If the destination setting button 1114 is selected, a destination selection mode selection screen 1116 is displayed. On the destination selection mode selection screen 1116, a channel selection button 1117 and the thread selection button 1118 are selectable.

If the channel selection button 1117 is selected, the channel selection screen 1119 is displayed. Channels and users displayed on the channel selection screen 1119 are displayed based on the channel list information received from the message application server 300 by the MFP 101. On the channel selection screen 1119, a posting destination channel and a user of the channel as a notification target user can be selected. Specifically, a channel as a posting destination and a user to mention to can be selected. When a channel button is selected, a pulldown menu of users belonging to the channel is displayed. On this screen, both a channel and a user can be selected, or only a channel can be selected to post on all the users belonging to the channel. A plurality of channels can be selected, or a single channel can be selected to select a plurality of users from the channel. A plurality of channels can be selected to select different users belonging to the channels.

If a return button 1115 is selected, details of the channel selection are stored, and the scan-to-chat screen 1101 is displayed again. At this time, a posting destination section 1102 displays "posting destination: channel 3 @ user 1" indicating a name of the selected channel as a posting destination and a name of the notification target user. The CPU 111 of the MFP 101 stores the posting destination based on the set channel and the set user at this time in the RAM 113 or the storage 114.

If the thread selection button 1118 is selected, the thread selection screen 1120 on which information about a plurality of threads is displayed is displayed. The threads and the users displayed on the thread selection screen 1120 are based on the thread list information received from the message application server 300 by the MFP 101. On the thread selection screen 1120, a posting destination thread and a user of the channel including the thread as a notification target user can be selected. Specifically, a thread on which image data is to be posted and a user to mention to can be selected. In a case where a thread button is selected, a pull-down menu of a list of messages of the thread is displayed. On this screen, both a thread and a user can be selected, or only a thread can be selected. A plurality of threads can be selected, or a single thread can be selected to select a plurality of users from a channel that includes the selected thread. A plurality of threads can be selected to select different users belonging to the threads can be selected. Variations that are settable on the screen will be described in detail below with reference to FIG. 13.

On the thread selection screen 1120, a thread list and a title or a first-posted message of each thread are displayed. In a case where a thread is selected, the last-posted message of the selected thread or messages posted on the selected thread can be displayed. In a case where only part of the messages posted on the thread, such as the first message and/or the last message, is displayed, the MFP 101 can receive only the part of the messages from the message application server 300. This makes it unnecessary to receive all the messages of the designated thread, and produces an effect that a storage area to be allocated by the MFP 101 decreases. Since only the part of the thread is displayed, the screen display is not excessively occupied, and the user can identify the thread.

The thread list displayed on the thread selection screen 1120 can display a thread included in a channel selected on the channel selection screen 1119. In a case where no channel is selected, a thread list including all threads of a pre-designated workspace (team) can be displayed. While candidate threads are displayed to prompt the user to select a thread in the above-described example, this is not a limiting configuration. For example, in a case where there is identification information, such as a thread name and thread ID, the user can be prompted to manually input the identification information. The user can be prompted to select identification information.

Returning to the description of the processing flow in FIG. 8, in step S802, the CPU 111 displays the scan-to-chat screen 1101 illustrated in FIG. 11A on the operation unit 116. In step S803, the CPU 111 detects selection of the destination setting button 1114.

In step S804, the CPU 111 performs processing of transmitting information indicating a request for channel information to the message application server 300 via HTTP communication using token information 1203 and user ID that are registered in advance based on the selection of the channel selection button 1117 by the user.

An example of a setting registration screen illustrated in FIG. 12 will now be described. The setting registration screen 1201 is a screen that is displayed on the operation unit 116 of the MFP 101. The setting registration screen 1201 can be displayed as a webpage on an operation unit of an information processing apparatus, such as a PC, connected to the MFP 101 via a network. Information registered via the setting registration screen 1201 is stored.

A connection destination 1202 is a column indicating organization information about connection destinations. The token information 1203 is a column indicating registered token information. Operation buttons 1204 is a column indicating operation buttons. An edit button 1205 and a generate button 1206 are displayed in this column.

If the edit button 1205 is selected, character strings of the token information and the connection destination information can be input or changed using a user interface such as a keyboard. If the generate button 1206 is selected, a setting is set to display the scan-to-chat button 602 on the home screen 608.

If a new registration button 1207 is selected, character strings input by the user are accepted and the connection destination and the token information are additionally registered.

Returning to the description of the processing flow in FIG. 8, in step S805, the CPU 111 performs processing of transmitting information indicating a request for thread information to the message application server 300 via HTTP communication using the token information 1203 and the user ID information that are pre-registered.

In step S806, the CPU 111 determines whether channel information and thread information are received from the message application server 300 in response to the channel acquisition request transmitted in step S804 and the thread acquisition request transmitted in step S805. Specifically, in a case where a status code in an HTTP communication response indicates an error or in a case where body information of the response contains a parameter indicating that information cannot be acquired, the CPU 111 determines that channel list information or thread list information is not received. If the CPU 111 determines that channel information and thread information are received (YES in step S806), the processing proceeds to step S809. Otherwise (NO in step S806), the processing proceeds to step S807.

In step S807, the CPU 111 displays information indicating that channel list information is not received on the channel selection screen 1119. At this time, channel choices and user choices are not displayed on the channel selection screen 1119.

In step S808, the CPU 111 determines whether the return button 1115 is selected. If the CPU 111 determines that the return button 1115 is selected (YES in step S808), the processing returns to step S802. Otherwise (NO in step S808), the processing remains at step S808.

In step S809, the CPU 111 determines whether a destination selection mode is selected.

If the channel selection button 1117 is selected (YES in step S809), the processing proceeds to step S810. If the thread selection button 1118 is selected (NO in step S809), the processing proceeds to step S819.

In step S810, the CPU 111 displays the channel selection screen 1119 displaying the channel information received from the message application server 300 on the touch panel 601 of the operation unit 116.

In step S811, the CPU 111 determines whether the posting destination (channel, or channel and user) selected on the channel selection screen 1119 is confirmed via the touch panel 601 of the operation unit 116. If the selected posting destination is confirmed (YES in step S811), the processing proceeds to step S812. In step S812, posting channel list information is updated. If the selected posting destination is not confirmed (NO in step S811), the processing returns to step S810. The confirmation detection is performed based on whether the return button 1115 is selected. In a case where a confirm button is displayed on a screen of the operation unit 116, the processing proceeds as described above in selecting the confirm button.

In step S819, the CPU 111 displays the thread selection screen 1120 displaying the thread information received from the message application server 300 on the touch panel 601 of the operation unit 116.

In step S820, the CPU 111 determines whether the posting destination (thread, channel, or channel and user) selected on the thread selection screen 1120 is confirmed via the touch panel 601 of the operation unit 116. If the selected posting destination is confirmed (YES in step S820), the processing proceeds to step S812. In step S812, as described above, the posting channel list information is updated. If the selected posting destination is not confirmed (NO in step S820), the processing returns to step S819. The confirmation detection is performed based on whether the return button 1115 is selected. In a case where a confirm button is displayed on a screen of the operation unit 116, the processing proceeds as described above in selecting the confirm button.

In step S812, the CPU 111 displays the scan-to-chat screen 1101 illustrated in FIG. 11B on the operation unit 116 and updates the display of the posting destination section 1102 with the confirmed posting destination. At this time, information about notification target user is displayed together with the posting destination channel. The thread information can also be displayed.

In step S813, the CPU determines whether the start monochrome printing button 1109 or the start color printing button 1110 displayed on the operation unit 116 is selected. If the CPU determines that the start monochrome printing button 1109 or the start color printing button 1110 is selected (YES in step S813), the processing proceeds to step S814. Otherwise (NO in step S813), the processing returns to step S813.

In step S814, the CPU 111 controls the reading unit 118 based on the scan settings, reads a document image, and generates image data. The scan settings that are set by the user via the scan-to-chat advanced setting screen (not illustrated) and are received from the message application server 300 are used.

In step S815, the CPU 111 converts the image data generated in step S814 into the file format 1113 set on the transmission setting screen 1112. In another exemplary embodiment, this processing can be skipped.

In step S816, the CPU 111 generates a posting parameter. The posting parameter includes a posting destination channel, thread information, a file format, a file name, and a posting comment. The file format is set corresponding to the file format 1113 set in the transmission settings. The posting comment is generated by adding an "@" mark at the beginning of the notification target user information. The file name is designated in the transmission settings.

In step S817, the CPU 111 transmits, to the message application server 300, the file generated in step S815 and the posting parameter by using an HTTP communication POST method using the token information 1203 registered in advance. By transmitting the data (the file generated by converting the image data, and the posting parameter) to the message application server 300, the message application server 300 posts on the specified thread of the specified channel based on the received parameter. At this time, the image data itself can be posted (uploaded) on the thread, or information, such as a link, for referring to the image data can be added to the thread. The posting of the image data and the adding of the information are performed by the message application server 300.

In step S818, the CPU 111 receives a posting result from the message application server 300 and displays the posting result on the touch panel 601 of the operation unit 116. With the present exemplary embodiment, the user can easily post a file on a channel and a thread of the message application server 300 from the MFP 101.

While only a single piece of token information is registered according to the present exemplary embodiment, the processing that involves token information, such as steps S804, S806, and S817, is performed a number of times corresponding to the number of registered tokens in a case where a plurality of pieces of token information is registered.

An example of a screen displayed on the operation panel 201 of the mobile terminal 200 as a result of transmitting the file generated by converting the image data and the posting parameter to the message application server 300 in step S817 will now be described with reference to FIG. 10.

Figure 10:
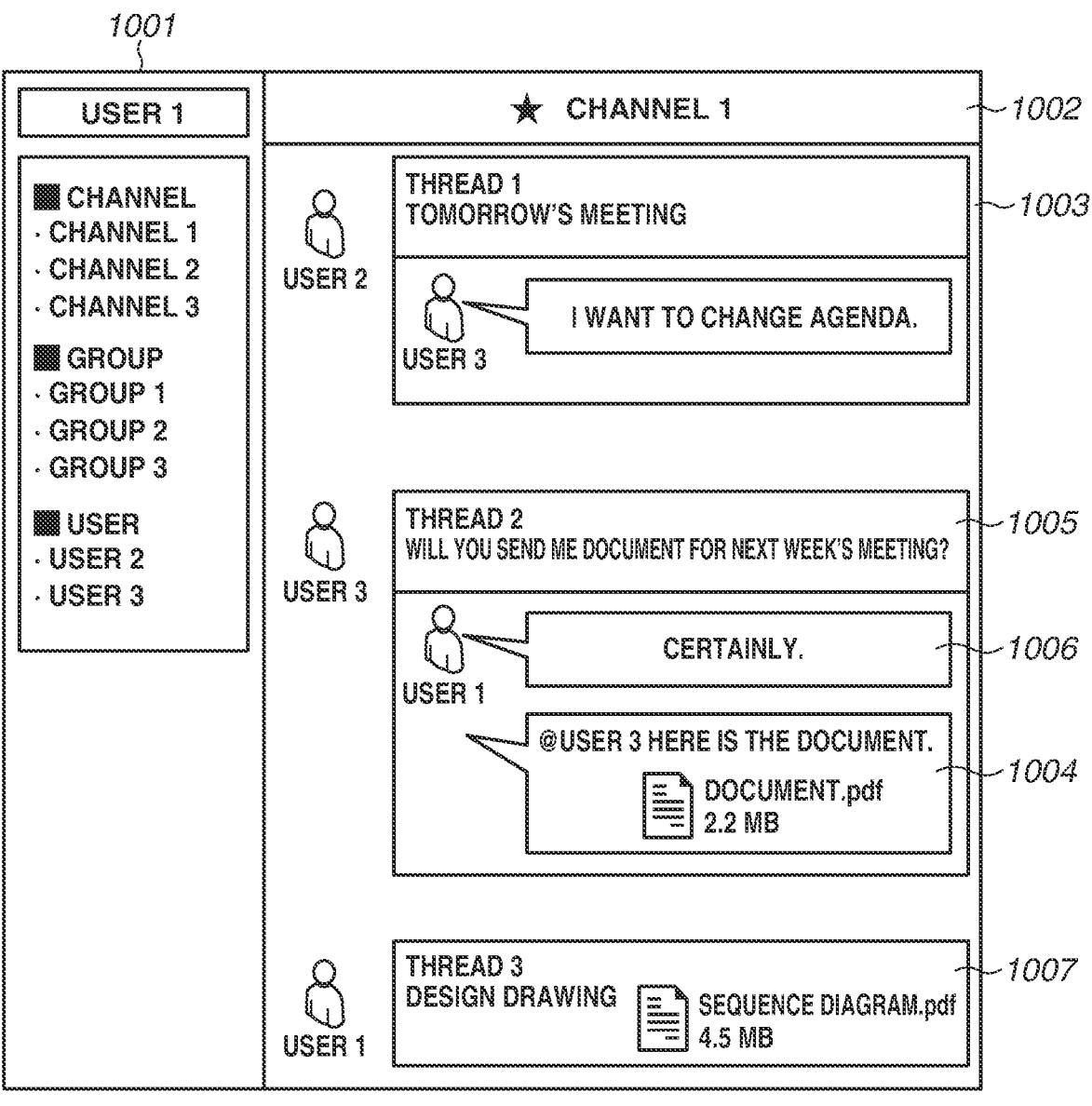
FIG. 10 is a diagram illustrating an example of a message screen of a message application.

FIG. 10 is a diagram illustrating an example of a message screen of the message application. A message screen 1001 in FIG. 10 is displayed by the message application being activated on the mobile terminal 200 and processing of step S817 is performed by the MFP 101. The mobile terminal 200 communicates with the message application server 300.

The user activates the message application on the mobile terminal 200 and logs in by inputting an ID and a password for an account of the user, whereby a screen only for the user is displayed.

A thread message 1005 is displayed when a user having an account "USER 3" transmits the thread message with the title "THREAD 2" and the content "WILL YOU SEND ME DOCUMENTS FOR NEXT WEEK'S MEETING?" to the message application server 300.

A message 1006 is a thread message that is displayed when a user having an account "USER 1" posts a response message to the thread message 1005.

A message 1004 is a thread message that is displayed when the user having the account "USER 1" posts a response message to the thread message 1005. The message 1004 is a message displayed (posted) when the user having the account "USER 1" transmits the image data generated by scanning and the posting parameter to the message application server 300 by using the MFP 101 using user ID information about user 1. In the example illustrated in FIG. 10, "CHANNEL 1" is designated as a posting channel out of the posting parameters, "THREAD 2" is designated as a posting thread out of the posting parameters, and "USER 3" belonging to "CHANNEL 1" is designated as a user. In addition, "DOCUMENT.pdf" is designated as a file name of the posting parameter, and "HERE IS THE DOCUMENT" is designated as a comment. The file name and the comment are designated by the user via the scan-to-chat advanced setting screen (not illustrated).

A thread message 1007 is displayed when the user having the account "USER 1" transmits the thread message with the title "THREAD 3" and the content "DESIGN DRAWING" to the message application server 300. A new thread is generated and a similar screen is displayed also in a case where message information is transmitted to a channel without designating a thread.

The message screen 1001 displays channels, groups, and users in which the logged-in user participates. Partner information (1002) and exchanged messages are displayed (1003). In posting, a comment is issued with an "@" mark at the beginning of a username, whereby a notification is transmitted to the specific user in the channel. In the case illustrated in FIG. 10, user 3 can recognize the receipt of the posting earlier than other members of the channel based on a message application viewing terminal. In a case where the mobile terminal 200 that user 3 is viewing is a smartphone, a user notification is performed using, for example, an icon notification function, a vibration, or a ringtone. In a case where the mobile terminal 200 that user 3 is viewing is a desktop terminal, a user notification is performed using, for example, a desktop notification function. In displaying the message screen 1001, the message application server 300 searches for necessary information from the data configuration illustrated in FIG. 9 and displays the information. For example, the posting of the message 1004 corresponds to "THREAD 2+COMMENT 3+FILE 1" of exchanged content 505, and attribute information such as a name of FILE 1 is obtained from a file 504, and a file icon is displayed on the message. A user can obtain File 1 of the file 504 by selecting the file icon. While the file posted on the channel is displayed in the form of an icon, a preview image of the file can be displayed.

Figure 9:
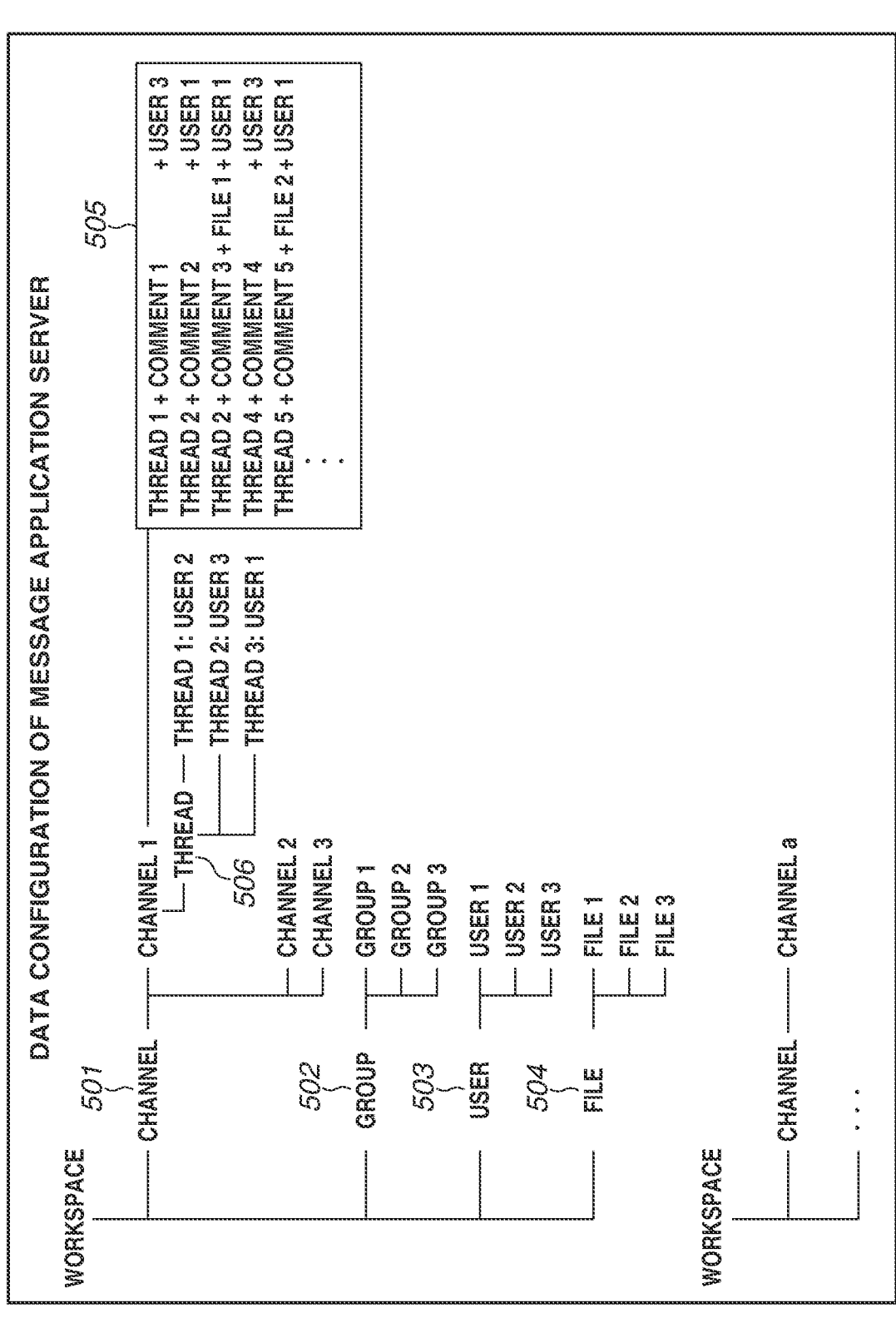
FIG. 9 is a diagram illustrating an example of a file configuration in the message application server.

FIG. 9 is a diagram illustrating an example of a file configuration in the message application server 300. The file configuration is stored in the HDD 305 of the message application server 300, and the screen illustrated in FIG. 10 is displayed based on the file configuration. The message application server 300 manages data using workspaces, which are the largest sets, and small sets therein, such as channels, groups, users, and files. A channel 501 represents a type of a chatroom that all members of the workspace can participate in and anybody can search for posted content. A group 502 represents a channel for conversations that are not to be opened to all members, and an invitation is required to view and participate in the group 502. A user 503 represents users participating in the workspace. The file 504 stores attached files. A thread 506 is a thread of conversations included in channel 1. Each thread is generated by a user. For example, an owner of thread 1 is user 2. Each thread is associated with a channel and includes one or more comments. The exchanged content 505 exchanged in the channels, the threads, the groups, and the users is stored in association with the channels, the threads, the groups, or the users. For example, users participating in channel 1 are stored in association with channel 1, and messages and image data exchanged in channel 1 are also stored in association with channel 1. Thus, in a case where a channel is selected on the channel selection screen 1119, users and threads associated with the selected channel information are displayed. The users participating in the channel are displayed.

FIG. 13 is a diagram illustrating an example of a thread selection screen. More specifically, the thread selection screen in FIG. 13 is an example of another form of the thread selection screen 1120 illustrated in FIG. 11B. The thread selection screen in FIG. 13 can replace the thread selection screen 1120 in FIG. 11B.

Each time a change mode button 1305 is selected, the thread selection screen in FIG. 13 is switched to a time mode screen 1301, a user mode screen 1308, and a channel mode screen 1313 in this order. The information can be narrowed down and rearranged according to the corresponding element.

A current screen mode can be identified by checking a screen title 1302, 1309, or 1314. The display content can be sorted by selecting a sort button 1304, where each time the sort button 1304 is selected, the display order is switched between ascending and descending orders. Update time 1303 displays the date and time of the last updating of each thread. When a today button 1307 is selected on the time mode screen 1301 on, for example, April 1, only the threads with the date of the last updating of April 1 are displayed on a time mode screen 1306. In other words, threads other than the threads with the date of the last updating of April 1 are not displayed. User information 1310 displays usernames of owners by whom the threads are generated.

The threads can be limited to not only "today", but also "last week" or a time range selected by the user.

If a logged-in user button 1312 is selected on the user mode screen 1308, only the threads that the user currently logged into the MFP 101 is either an owner of or a responder to the threads are displayed on a user mode screen 1311. For example, only the threads on which a message is posted by the user currently logged into the MFP 101 are displayed. At this time, user information about the user currently logged into the MFP 101 is associated with user information on the chat service. Thus, the user information about the user currently logged into the MFP 101 on the chat service is identified.

In a case where a "LOGGED-IN USER AS OWNER" button is selected, only the threads that the user 1309 currently logged into the MFP 101 is an owner of the threads are displayed. The threads can be narrowed down to a specific user or group.

In a case where a My Channel button 1316 is selected on the channel mode screen 1313, only the threads of the channel that the user currently logged into the MFP 101 is an administrator of the channel are displayed on a channel mode screen 1315. A target channel can be designated to display only the threads that relate to the designated channel. With the screen for the narrowing down and rearranging, the user can easily select a thread to which a file is to be uploaded.

As illustrated in FIG. 13, the user can display thread information in a desired display format because the thread information received from the message application server 300 by the MFP 101 includes the date and time of the updating of the thread, information about the user having posted on the thread, and owner information. The MFP 101 interprets the received thread information and displays the thread selection screen illustrated in FIG. 13.

The above-described processes enable a user to easily upload image data generated by an image processing apparatus by scanning a document image to a desired thread of a channel of a chat service.

In the above-described example according to the present exemplary embodiment, the MFP 101 directly communicates with the message application server 300 to receive channel information and thread information from the message application server 300 and to transmit image data generated by scanning to the message application server 300. In another exemplary embodiment, the above-described processes can be performed via a relay server serving as an information processing apparatus that communicates with a plurality of MFPs. Specifically, the relay server receives the request in step S701 from the MFP 101 and then transmits the received request to the message application server 300. The relay server receives channel information and thread information as a response to the request from the message application server 300, and transmits the channel information and the thread information to the MFP 101 from which the request is transmitted. Steps S705 to S709 are performed by the MFP 101 as in FIG. 7. The relay server then receives a generated file, the channel information, and the thread information from the MFP 101, and transmits the received information to the message application server 300.

Figure 12:
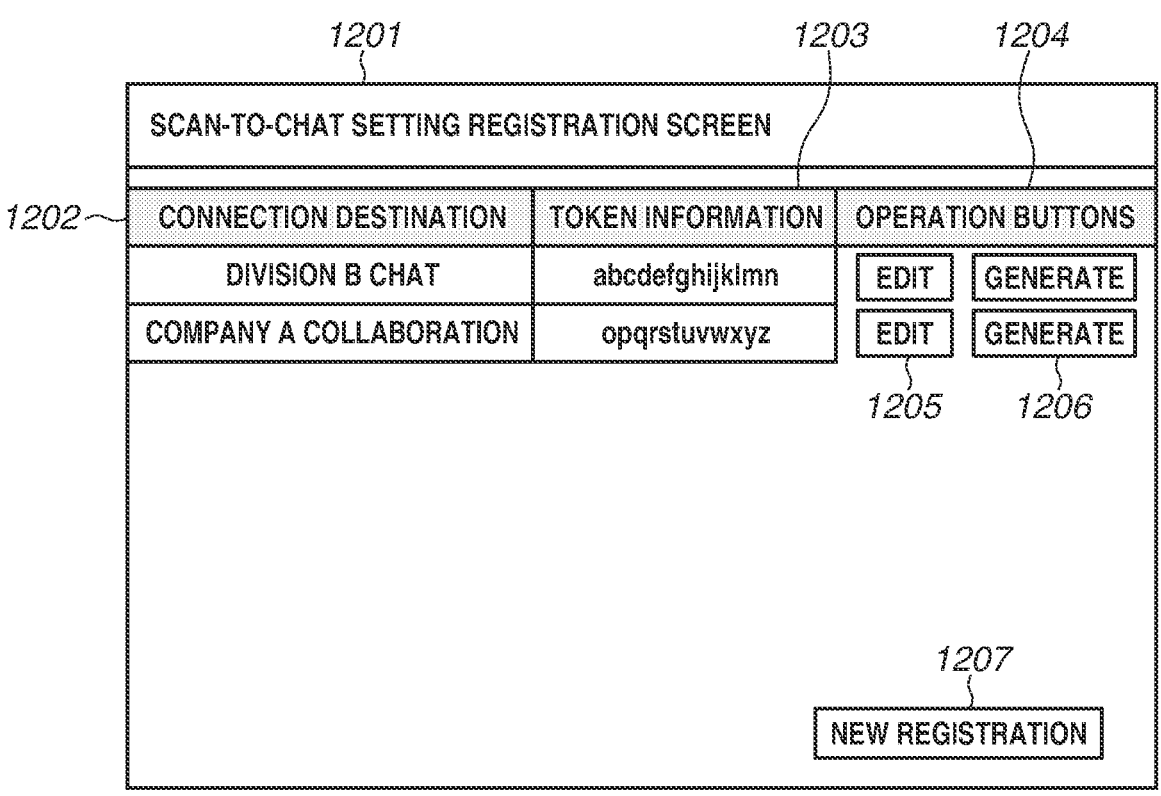
FIG. 12 is a diagram illustrating an example of a setting registration screen.

The relay server can store a table associating the connection destinations and the token information with each other that are set in FIG. 12. This enables the relay server to centrally manage the table associating the connection destinations and the token information with each other without storing the table in the MFP 101. Thus, a risk of information leakage decreases.

According to the present exemplary embodiment, image data or information (e.g., link) indicating the image data is uploaded (added) to a thread selected on the MFP 101. There is, however, a possibility that the thread on the message application is deleted while the thread is selected on the MFP 101 or while the scan settings are set. In this case, a new thread can be generated to upload the image data or the information to the generated thread.

Specifically, in step S710, the CPU 301 of the message application server 300 determines that the thread indicated by the thread information included in the request transmitted from the MFP 101 to the message application server 300 does not exist on the message application server 300. In a case where the thread exists on the chat service, the processing in step S711 is performed. In a case where the thread does not exist, a notification thereof is transmitted to the MFP 101. The MFP 101 having received the notification transmits a new command to the message application server 300 to request the message application server 300 to post the image data on the new thread. This transmission processing can be performed automatically without accepting a user operation, or a notification indicating that the thread does not exist can be displayed on a screen of the operation unit 116 to check whether to upload the image data to the new thread or to cancel the upload. Then, in a case where an instruction to upload the image data to the new thread is received from the user, a request to upload the image data to the new thread is transmitted to the message application server 300. In a case where a cancelation is selected, the process is ended.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-191855, filed Nov. 26, 2021, which is hereby incorporated by reference herein in its entirety.

What is claimed is:

1. A scanning apparatus comprising:
   a scanner that scans an image of a document and generates image data based on the image;
   one or more memories that store a set of instructions;

one or more processors that execute the set of instructions to:

perform a log-in process for causing a user to log in to the scanning apparatus;

accept selection, by the user, of a channel of a chat service;

specify, based on user information of the user who logs in to the scanning apparatus, one or more threads that are associated with the selected channel and that are generated by the user who logs in to the scanning apparatus and that include one or more messages posted to the selected channel;

display the specified one or more threads among one or more threads associated with the selected channel without displaying any other one or more threads associated with the selected channel;

accept selection, by the user, of a thread from the displayed one or more threads; and a communicator that transmits the generated image data, wherein information indicating the generated image data is posted, by transmission of the generated image data, to the selected thread of the channel, and wherein the scanner scans, based on receiving a single execution instruction, the image of the document to generate the image data and then the communicator transmits, based on receiving the single execution instruction, the generated image data.

2. The scanning apparatus according to claim 1, wherein the communicator receives information about a plurality of threads from a chat server, wherein the one or more processors further execute the set of instructions to:

display on a display the received information about the plurality of threads, and accept the selection of the thread from the displayed information about the plurality of threads.

3. The scanning apparatus according to claim 1, wherein the one or more processors display a confirmation screen for confirming whether to post the image data to another thread or cancel posting the image data to the selected thread in a case where the selected thread does not exist on the chat service.

4. The scanning apparatus according to claim 2, wherein in a case where the one or more processors accept designation of date and time, the one or more processors further execute the set of instructions to display information about a thread updated at the designated date and time from among the received information about the plurality of threads without displaying information about another thread other than the updated thread.

5. The scanning apparatus according to claim 2, wherein in a case where the one or more processors accept an instruction from the user, the one or more processors further execute the set of instructions to display information about a thread on which a message is posted by the user from among the received information about the plurality of threads without displaying information about another thread other than the thread on which the message is posted by the user.

6. The scanning apparatus according to claim 1, further comprising a conveyor that conveys the document, wherein the scanner scans the image of the document conveyed by the conveyor and generates the image data.

7. The scanning apparatus according to claim 1, wherein in a case where the selected thread does not exist on the chat service, the communicator further transmits the image data so that information indicating the generated image data is added to a new thread.

8. The scanning apparatus according to claim 1, wherein in a case where the selected thread does not exist on the chat service, the one or more processors further execute the set of instructions to display that the selected thread does not exist.

9. The scanning apparatus according to claim 1, wherein the communicator transmits the generated image data and identification information about the selected thread to a chat server, where the chat server posts the image data to the thread indicated by the identification information.

10. The scanning apparatus according to claim 1, wherein, in a case where a first user interface button is selected by the user on a display, the one or more processors are configured to:

identify, based on the user information of the user logged into the scanning apparatus, one or more threads that are associated with the selected channel and that were generated by the logged-in user and that include one or more messages posted to the selected channel; and display the identified one or more threads on the display without displaying any other threads associated with the selected channel, wherein, while the first user interface button and the identified one or more threads are displayed, a second user interface button is also displayed on the display; and wherein, in a case where the second user interface button is selected by the user, the one or more processors are further configured to:

identify, based on the user information of the user logged into the scanning apparatus, one or more threads that are associated with the selected channel and in which the logged-in user has posted at least one message, and that include one or more messages posted to the selected channel, wherein the identified one or more threads were generated by any users; and display the identified one or more threads on the display without displaying any other one or more threads associated with the selected channel.

11. A scanning method comprising:

scanning an image of a document and generating image data based on the image;

performing a log-in process for causing a user to log in to a scanning apparatus;

accepting selection, by the user, of a channel of a chat service;

specifying, based on user information of the user who logs in to the scanning apparatus, one or more threads that are associated with the selected channel and that are generated by the user who logs in to the scanning apparatus and that include one or more messages posted to the selected channel;

displaying the specified one or more threads among one or more threads associated with the selected channel without displaying any other one or more threads associated with the selected channel;

accepting selection, by the user, of a thread from the displayed one or more threads; and transmitting the generated image data, wherein information indicating the generated image data is posted, by transmission of the generated image data, to the selected thread of the channel, and wherein the image of the document is scanned, based on receiving a single execution instruction, to generate the image data and then the generated image data is transmitted based on receiving the single execution instruction.

12. A non-transitory computer-readable storage medium storing a program for causing a computer to execute a scanning method, the scanning method comprising:

scanning an image of a document and generating image data, based on the image;

performing a log-in process for causing a user to log in to a scanning apparatus;

accepting selection, by the user, of a channel of a chat service;

specifying, based on user information of the user who logs in to the scanning apparatus, one or more threads that are associated with the selected channel and that are generated by the user who logs in to the scanning apparatus and that include one or more messages posted to the selected channel;

displaying the specified one or more threads among one or more threads associated with the selected channel without displaying any other one or more threads associated with the selected channel;

accepting selection, by the user, of a thread from the displayed one or more threads; and transmitting the generated image data, wherein information indicating the generated image data is posted, by transmission of the generated image data, to the selected thread of the channel, and wherein the image of the document is scanned, based on receiving a single execution instruction, to generate the image data and then the generated image data is transmitted based on receiving the single execution instruction.

* * * * *